(12) United States Patent
Khrapko et al.

(10) Patent No.: US 7,536,076 B2
(45) Date of Patent: May 19, 2009

(54) OPTICAL FIBER CONTAINING ALKALI METAL OXIDE

(75) Inventors: Rostislav Radievich Khrapko, Corning, NY (US); Hazel B Matthews, III, Wilmington, NC (US)

(73) Assignee: Corning Incorporated, Corning, NY (US)

(*) Notice: Subject to any disclaimer, the term of this patent is extended or adjusted under 35 U.S.C. 154(b) by 13 days.

(21) Appl. No.: 11/801,472

(22) Filed: May 10, 2007

(65) Prior Publication Data

US 2007/0297735 A1 Dec. 27, 2007

Related U.S. Application Data

(60) Provisional application No. 60/840,807, filed on Aug. 29, 2006, provisional application No. 60/815,732, filed on Jun. 21, 2006.

(51) Int. Cl.
*G02B 6/00* (2006.01)
(52) U.S. Cl. ............................ 385/142; 385/141
(58) Field of Classification Search .................. 385/142
See application file for complete search history.

(56) References Cited

U.S. PATENT DOCUMENTS

| | | | |
|---|---|---|---|
| 3,826,560 A | 7/1974 | Schultz | 350/96 |
| 4,148,621 A | 4/1979 | Gliemeroth | 65/3 A |
| 4,165,223 A | 8/1979 | Powers | 65/2 |
| 4,173,305 A | 11/1979 | Blankenship | 239/79 |
| 4,504,297 A | 3/1985 | Kosinski et al. | 65/3.11 |
| 4,515,612 A | 5/1985 | Burrus, Jr. et al. | 65/3.12 |
| 4,629,485 A | 12/1986 | Berkey | 65/3.12 |
| 5,146,534 A | 9/1992 | Lines | 385/142 |
| 6,153,546 A | 11/2000 | Saitoh et al. | 501/37 |
| 2005/0063663 A1 | 3/2005 | Anderson et al. | 385/142 |
| 2005/0201699 A1 | 9/2005 | Ball et al. | 385/123 |

FOREIGN PATENT DOCUMENTS

GB 2149392 6/1985

OTHER PUBLICATIONS

Y. Yamamoto et al, "Water-Free Pure-Silica Core Fibre", ECOC 2004 Proceedings, vol. 4, pp. 844-847, Paper Th2.3.1.

*Primary Examiner*—Michelle R Connelly Cushwa
*Assistant Examiner*—Rhonda S Peace
(74) *Attorney, Agent, or Firm*—Robert L. Carlson

(57) ABSTRACT

Disclosed is an optical fiber having a silica-based core comprising an alkali metal oxide selected from the group consisting of $K_2O$, $Na_2O$, $LiO_2$, $Rb_2O$, $Cs_2O$ and mixtures thereof in an average concentration in said core between about 50 and 500 ppm by weight, said core further comprising chlorine and fluorine, wherein the average concentration of fluorine in said core is greater than the average concentration of alkali metal oxide in said core and the average concentration of chlorine in said core is greater than the average concentration of alkali metal oxide in said core; and a silica-based cladding surrounding and directly adjacent the core. By appropriately selecting the concentration of alkali metal oxide dopant in the core and the cladding, a low loss optical fiber may be obtained.

18 Claims, 4 Drawing Sheets

OPTICAL FIBER CONTAINING ALKALI METAL OXIDE

CROSS-REFERENCE TO RELATED APPLICATIONS

This application claims the benefit and priority under 35 U.S.C. § 119(e) of U.S. Provisional Application Ser. No. 60/815,732 filed on Jun. 21, 2006, and U.S. Provisional Application Ser. No. 60/840,807 filed on Aug. 29, 2006, the contents of which are relied upon and incorporated herein by reference in their entirety.

BACKGROUND OF THE INVENTION

1. Field of the Invention

The present invention relates generally to an optical fiber doped with an alkali metal oxide and methods and apparatus for making same.

2. Technical Background

Attenuation is a principal limiting attribute of optical fibers. Optical fiber loss, for example, plays an important role in setting the limiting distance between optical fiber amplifiers. This is particularly important in long distance and ultra-long distance networks such as, for example, undersea applications, where such amplifiers represent a significant system cost, as well as a major factor in system reliability. Consequently there is tremendous commercial interest in reducing attenuation to the lowest possible level.

SUMMARY OF THE INVENTION

One broad aspect of the present invention relates to an optical fiber having a silica based core comprising fluorine, chlorine, and an alkali metal oxide selected from the group consisting of $K_2O$, $Na_2O$, $LiO2$, $Rb_2O$, $Cs_2O$ and mixtures thereof. The alkali metal oxide is preferably present in the core in an average concentration in said core between about 50 and 500 ppm by weight, more preferably between about 100 and 300 ppm by weight. The average concentration of fluorine in said core is preferably greater than the average concentration of alkali metal oxide in said core and the average concentration of chlorine in said core is likewise preferably greater than the average concentration of alkali metal oxide in said core. By average concentration as used herein, we mean the average concentration over the entire core. Thus, for example, if the inner 50 percent of the core exhibits 300 ppm by weight $K_2O$, and the outer 50 percent of the core exhibits 400 ppm by weight $K_2O$, the average concentration of $K_2O$ in the core would be 350 ppm.

The core of said fiber preferably comprises chlorine in an average concentration in said core greater than about 750 ppm by weight. The cladding is a silica-based cladding which surrounds and preferably is directly adjacent the core. The cladding preferably contains fluorine in an amount greater than 10000 ppm. The core preferably consists essentially of no germanium, and more preferably the core is germanium free.

In one preferred embodiment, the core of said fiber comprises a first region located along the centerline of the core which contains chlorine in an amount less than 100 ppm, and a second core region surrounding said first region, wherein said chlorine content is greater than 100 ppm. The first region also preferably comprises a maximum fluorine amount which is greater than the minimum fluorine content in said second region.

The average concentration of chlorine in the core is preferably greater than 500, more preferably greater than 750 ppm, even more preferably greater than 1000 ppm, and most preferably greater than about 1500 ppm. The average concentration of fluorine in the core is preferably greater than 500, more preferably greater than 750 ppm, even more preferably greater than 1000 ppm, and most preferably greater than about 1500 ppm.

Using the alkali metal oxide doping techniques disclosed herein, optical fibers can be made which exhibit an attenuation less than about 0.30 dB/km at 1310 nm and less than about 0.175 dB/km at 1550 nm; preferably less than about 0.170 dB/km at 1550 nm, more preferably less than about 0.16 dB/km at 1550 nm.

Preferably, both the core and the cladding of the optical fiber contain an alkali metal oxide dopant. The cladding glass of the optical fiber may comprise fluorine (F). The optical fiber has at least one core segment; in some preferred embodiments, the optical fiber comprises multiple core segments. The alkali metal oxide concentration at a radius equal to the mode field radius of the optical fiber is preferably at least about 0.001 wt. %.

The present invention proposes an optical fiber having a core comprising an alkali metal oxide selected from the group consisting of $K_2O$, $Na_2O$, $LiO2$, $Rb_2O$, $Cs_2O$ and mixtures thereof, wherein the core contains less than 20 ppb of OH.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention. Where appropriate, identical features have been identically numbered.

DETAILED DESCRIPTION OF THE INVENTION

Figure 1:
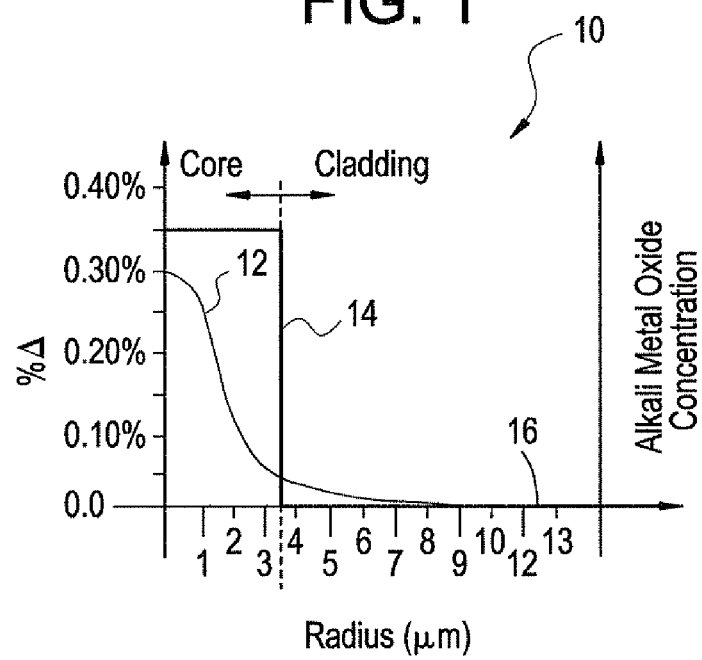
FIG. 1 is an illustration of a portion of a step index optical fiber refractive index profile having an alkali metal oxide concentration that varies with the radius of the optical fiber.

The present invention relates to a low loss optical fiber and methods for making the same. More specifically, the invention relates to an optical fiber doped with an alkali metal oxide dopant and methods for manufacturing the optical fiber and associated preforms. The following terms as used herein have the following meanings:

The mode field diameter is a measure of optical power across the endface of a single-mode optical fiber, and is expressed as:

$$2\omega_0 = (\lambda/\pi)[2\int I(\Phi) \sin \Phi \cos \Phi d\Phi / \int I(\Phi) \sin^3 \Phi \cos \Phi d\Phi]^{1/2} \quad (1)$$

where $2\omega_0$ is the mode field diameter (and therefore $\omega_0$ is the mode field radius), $\lambda$ is the mean wavelength of the light, $\Phi$ is the angle with respect to the center of the radiation pattern, and the integrations are preferably carried out from 0° to 90°. Mode field diameter may be measured, for example, according to test procedure ANSI/TIA/EIA-455-191-A-2001.

Effective area is $$A_{eff} = 2\pi (\int E^2 r \, dr)^2 / (\int E^4 r \, dr) \quad (2)$$

where the integration limits are 0 to ∞, and E is the electric field associated with the propagated light.

The relative refractive index, Δ, is defined by the equation $\Delta_i = (n_i^2 - n_c^2)/2n_i^2$, where $n_i$ is the maximum refractive index of the index profile segment i, and $n_c$ is the refractive index in the reference region which is usually taken to be the minimum index of the cladding layer. The relative refractive index is generally expressed as a percent and is indicated herein by the term % Δ. Unless otherwise indicated, % Δ represents the maximum relative refractive index of the core relative to the minimum refractive index of the cladding.

The term refractive index profile or simply index profile is the relation between % Δ and radius over a selected portion of the optical fiber, typically the core.

The term alpha profile refers to a core refractive index profile which follows the equation, $$n(r) = n_0(1 - [r/a]^\alpha) \quad (3)$$

where r is core radius, a is the last point in the profile, r is chosen to be zero at the first point of the profile, $n_0$ is the maximum refractive index of the core region of interest, and α is an exponent which defines the core profile shape. Other common core refractive index profile shapes include a step index, a trapezoidal index and a rounded step index, in which the rounding is due to dopant diffusion in regions of rapid refractive index change.

Core refers to that portion of the optical fiber which has a generally raised index of refraction relative to the cladding, so that the transmitted optical power propagates predominately through the core. The core may be comprised of one or more segments. An individual core segment may have a refractive index greater than pure silica, equal to pure silica, or less than pure silica.

"ppm", unless otherwise specifically noted otherwise, refers to parts per million by weight, or "ppm by weight", or "ppm by wt.", and a measurement in weight percent (wt %) can be converted to ppm by multiplying by a factor of 10,000.

The optical fiber disclosed herein comprises a core and a cladding surrounding and directly adjacent the core. Preferably, the core contains essentially no germania, more preferably the core contains no germania.

In some preferred embodiments, the core consists of a single core segment, namely a central core segment, and a cladding surrounding and directly adjacent the central core segment, as represented by FIG. 1 and variations of the illustrative profile of FIG. 1, such as profiles having a step, rounded, alpha or triangular shape, as discussed hereinabove, wherein the central core segment has a positive refractive index $\Delta_1(r)$ relative to the cladding. In other preferred embodiments, the core comprises multiple core segments, such as a central core segment and a first annular core segment surrounding and directly adjacent the central core segment, and a cladding surrounding and directly adjacent the first annular core segment, wherein the central core segment has a non-negative, preferably positive, relative refractive index $\Delta_1\%(r)$ relative to the cladding, and wherein the first annular core segment pure silica, has a non-negative, preferably positive, relative refractive index $\Delta_2\%(r)$ relative to the cladding.

Figure 2:
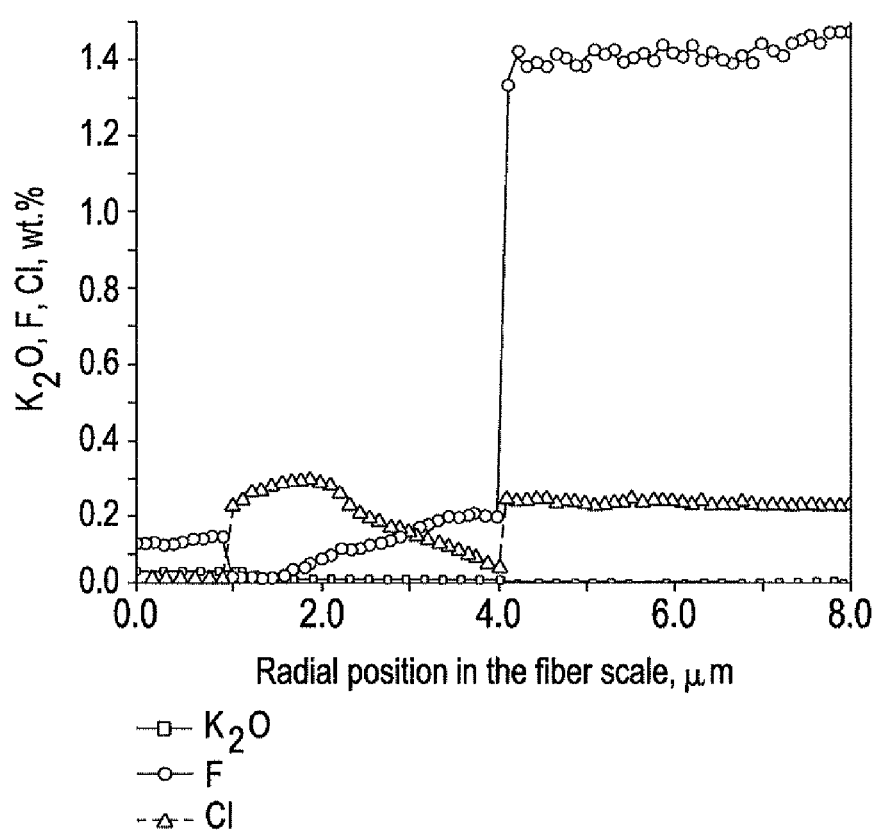
FIG. 2 is an illustrative example of an optical fiber in accordance with the invention, illustrating the concentration of K, Cl, and F in the core and a portion of the cladding of the optical fiber.

One exemplary embodiment of optical fiber in accordance with the invention is illustrated in FIG. 2. The fiber illustrated in FIG. 2 includes a silica based core region extending from 0 to about 4 microns, with a fluorine doped silica cladding surrounding the core region. The core region comprises an alkali metal oxide selected from the group consisting of $K_2O$, $Na_2O$, $LiO_2$, $Rb_2O$, $Cs_2O$ and mixtures thereof in an average concentration in said core between about 50 and 500 ppm by weight. The core further comprises chlorine and fluorine. Preferably, the average concentration of fluorine in said core is greater than the average amount of alkali metal oxide in said core and the average amount of chlorine in said core is greater than the average amount of alkali metal oxide in said core. The fiber also includes a silica-based cladding which surrounds and in the embodiment illustrated in FIG. 2 is directly adjacent the core.

In the embodiment illustrated, the core region comprises a first central core region (extending to about 1 micron) located along the centerline of the core which contains a lower average concentration of chlorine than is contained in the outer region (i.e., extending from about 1 to about 4 microns) of the core. In particular, the average concentration of chlorine present in the central core region may be is less than 100 ppm, more preferably less than 50 ppm, and the average concentration of chlorine in the second or outer core region which surrounds the first region may be greater than 500 ppm, more preferably greater than 750 ppm, even more preferably greater than 1000 ppm, and most preferably greater than 1500 ppm. The peak concentration of chlorine in the core region is preferably greater than 500 ppm, more preferably greater than 1000 ppm, and most preferably greater than 1500 ppm.

The average concentration of fluorine present in the central core region is preferably greater than 500 ppm, more preferably greater than 750 ppm, and most preferably greater than 1000 ppm, and the average concentration of fluorine in the second or outer core region which surrounds the first region is likewise preferably greater than 500 ppm, more preferably greater than 750 ppm, and most preferably greater than 1000 ppm.

The average concentration of fluorine across the entire core region is preferably greater than 500 ppm, more preferably greater than 750 ppm, and most preferably greater than 1000 ppm, and preferably less that 5000 ppm, more preferably less than 4000 ppm. In the embodiment illustrated, the peak concentration of the chlorine in said second core region is higher than the peak concentration of fluorine in said second region, although this relationship is not critical. Preferably, the average concentrations of both chlorine and fluorine in the core region are greater than about 500 ppm, more preferably greater than about 750 ppm, and most preferably greater than about 1000 ppm.

In some preferred embodiments, the optical fiber disclosed herein comprises a single core segment, namely a central core segment, and a cladding surrounding and directly adjacent the central core segment, wherein the cladding has a negative refractive index relative to pure silica, and wherein the core comprises fluorine and an alkali metal oxide selected from the group consisting of $K_2O$, $Na_2O$, $LiO_2$, $Rb_2O$, $Cs_2O$ and mixtures thereof, with a peak alkali metal oxide concentration of between 20 and 700 ppm, preferably between 50 and 500 ppm, even more preferably between 100 and 400 ppm; wherein the core further comprises a peak relative refractive index (relative to the cladding), $\Delta_{MAX}$, between 0.2 and 0.5%, preferably between 0.3 and 0.4%. The optical fiber comprises greater than 90 wt % SiO2, preferably greater than or equal to 95 wt % $SiO_2$.

Preferably, both the core and the cladding of the optical fiber contain an alkali metal oxide dopant. The alkali metal oxide is preferably an oxide of K, Na, Li, Cs, or Rb, or a mixture thereof; more preferably the alkali metal oxide is $K_2O$, $Rb_2O$, $Cs_2O$ or mixtures thereof; and most preferably the alkali metal oxide is $K_2O$. Preferably, the alkali metal oxide has a peak concentration in the core of the optical fiber. The alkali metal oxide concentration may vary radially across the radius of the optical fiber, and in some cases may decrease as a function of increasing radius from the centerline of the optical fiber along at least a portion of the optical fiber radius.

FIG. 1 shows an exemplary refractive index profile 10 of a single mode optical fiber having a single core segment, as well as an exemplary alkali metal oxide concentration profile 12 (alkali metal oxide concentration as a function of radius) which may be achieved by practicing the present invention. The optical fiber includes a core segment 14 and a cladding segment 16 which surrounds the core segment 14. Preferably, the alkali metal oxide concentration varies as a function of radius. Preferably, the concentration of alkali metal oxide generally decreases as a function of increasing radius from the centerline of the optical fiber along at least a portion of the optical fiber radius. Core segment 14 of the optical fiber may have a step shape as shown in FIG. 1, or core segment 14 may have a rounded, alpha or triangular shape.

The fibers of the present invention preferably consist essentially of no germanium in the core thereof. Instead, the cladding of the optical fibers contain enough index of refraction reducing dopant in the cladding to form a refractive index profile such as is illustrated in FIG. 1. In such embodiments, the refractive index of cladding segment 16 is less than pure silica and, of course, less than the core 14. The preferred index of refraction decreasing dopant for use in the cladding of optical fibers disclosed herein is fluorine.

In one embodiment according to the present invention, the refractive index profile of the optical fiber such as that disclosed in FIG. 1 which is tailored to result in a single mode optical fiber which preferably has a zero dispersion wavelength, $\lambda_0$, between about 1280 nm and 1340 nm, a dispersion slope at 1550 nm which is less than about 0.07 $ps/nm^2/km$, more preferably less than 0.06 $ps/nm^2/km$, and a total dispersion greater than about 15 ps/nm/km at 1550 nm, more preferably between about 15 ps/nm/km and 20 ps/nm/km at 1550 nm. However, other refractive index profiles could be used to achieve these same properties. Preferably, the optical fiber has a cutoff wavelength less than about 1500 nm, more preferably less than 1400 nm, most preferably less than 1300 nm. Preferably the optical fiber has an effective area greater than about 70 $\mu^2$, more preferably greater than about 80 $\mu m^2$ at 1550 nm. The optical fiber preferably has a core radius greater than about 3 $\mu m$, more preferably between about 3 $\mu m$ and 5 $\mu m$, and a mode field diameter greater than about 9 $\mu m$, more preferably between about 9.5 $\mu m$ and 11 $\mu m$, most preferably between about 10 $\mu m$ and 11 $\mu m$ at 1550 nm. By including an alkali metal oxide in accordance with the invention, optical fibers may be made which have an attenuation less than about 0.30 dB/km at 1310 nm and less than about 0.18 dB/km at 1550 nm; more preferably less than about 0.17 dB/km at 1550 nm, and most preferably less than about 0.16 dB/km at 1550 nm.

The diffusion of an alkali metal oxide may be advantageously controlled during the draw process. It has been found that by varying draw conditions in a prescribed manner, alkali metal oxide dopants may be distributed throughout the preform in a desired concentration profile. Preferably, the alkali metal oxide dopant is diffused in a relatively linear relationship with respect to radius. Because the diffusion of an alkali metal oxide dopant is partially dependent upon the temperature of the glass being doped, and the time the glass remains at the temperature, these same factors play a significant role in controlling the alkali metal oxide diffusion during the draw process. The time and the temperature to which an optical fiber preform (and the optical fiber drawn from the preform) are exposed during the draw process are controlled by varying the draw speed, the draw (furnace) temperature and optical fiber tension. For example, increasing the draw speed decreases the dwell time for a particular section of the optical fiber preform in the draw furnace, thus decreasing the distance which an alkali metal oxide dopant will diffuse across the optical fiber preform, and hence the drawn optical fiber. This may result in less alkali metal oxide diffusing into the cladding and, therefore, a higher alkali metal oxide concentration in the core of the optical fiber. Conversely, decreasing the draw speed increases the dwell time, and, therefore, may result in an decrease in the concentration of alkali metal oxide in the core of the optical fiber as the alkali metal oxide diffuses further into the cladding of the optical fiber. In a like manner increasing the furnace temperature may increase the diffusion rate of the alkali metal oxide, decreasing the concentration of alkali metal oxide. Consequently, draw speed and furnace temperature may be effectively used to control the diffusion, and thus the distribution of alkali metal oxide within the resulting optical fiber.

Figure 3:
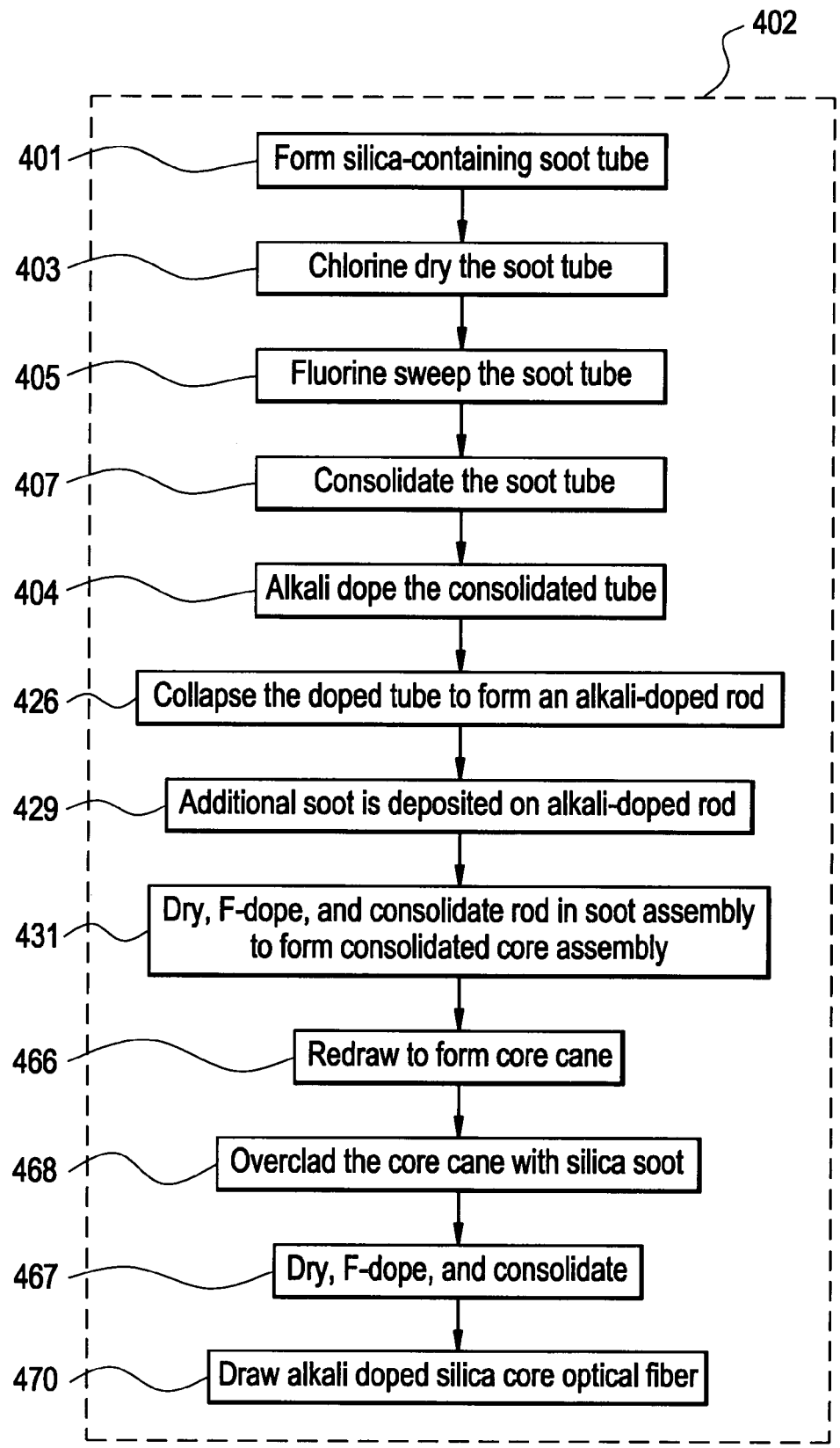
FIG. 3 illustrates a method of manufacturing an alkali metal oxide-doped optical fiber according to the present invention.
Figure 4:
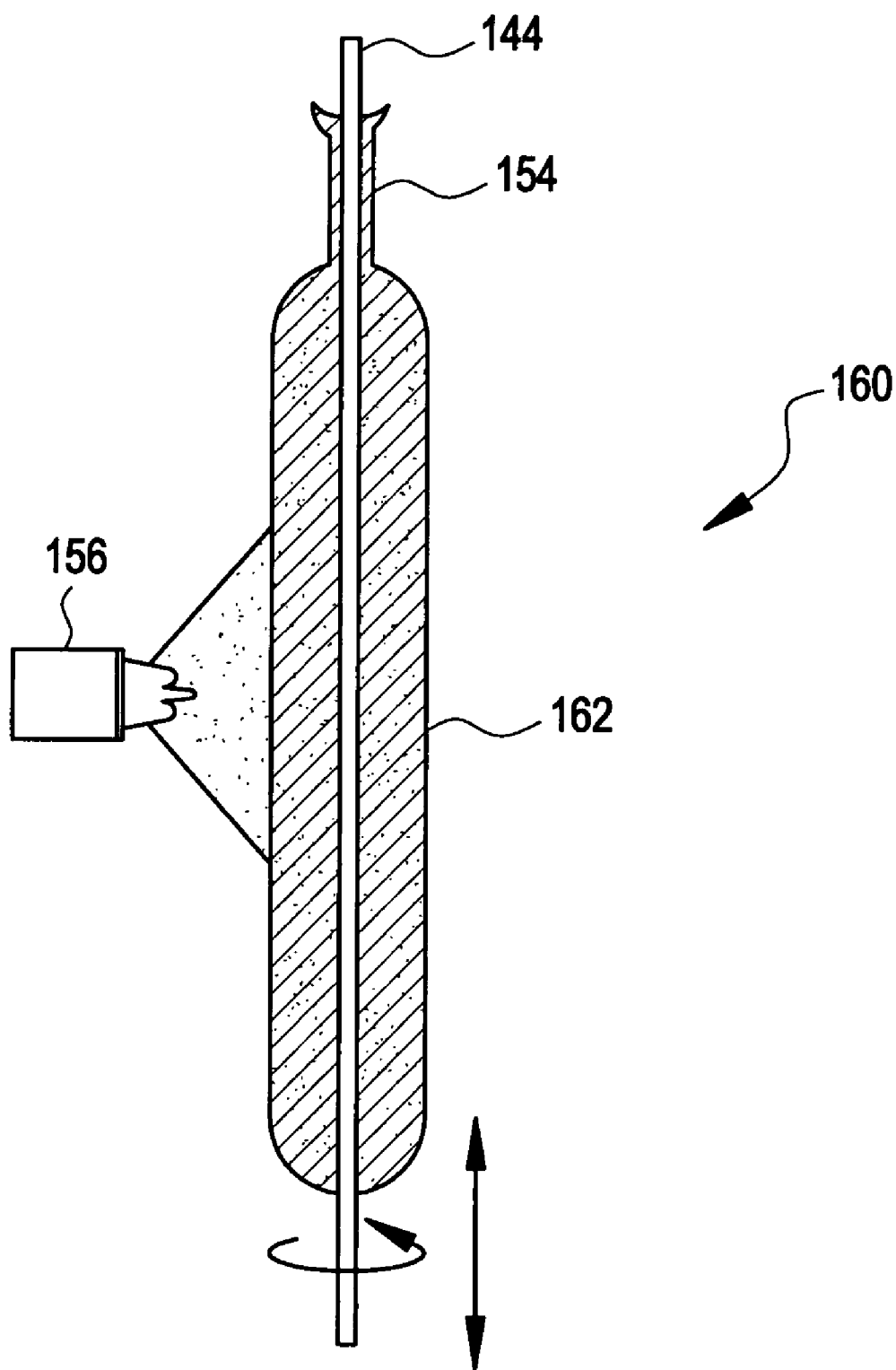
FIG. 4 shows a method of depositing glass soot.

Illustrated in FIG. 3 is a first method 402, in accordance with embodiments of the present invention, for producing an alkali-doped optical fiber by diffusing an alkali metal oxide into a suitable silica glass article that is a precursor to an optical fiber. A first step 401 of the method 402 is shown and described with reference to FIG. 3 and 4. Referring to FIG. 4 which is an illustration of a conventional outside vapor deposition process, a soot burner 156 is used to deposit multiple layers of silica soot 162 onto a mandrel 144 to form soot preform 160. The resultant soot preform is then dried (step 403) using standard chlorine drying techniques. The soot is then doped with fluorine (step 405) by exposing the soot to an atmosphere of a fluorine containing compound (e.g. $SiF_4$) for a time and at a temperature sufficient to result in removal of much or all of the chlorine remaining from the drying step. The exposure to a fluorine-containing atmosphere (fluorine sweep) is done at temperatures preferably less than about 1100° C. to avoid doping the glass with high levels of fluorine. Low levels of fluorine doping are desirable, i.e., 0.1 to 0.4 wt. % fluorine, for example. The resultant fluorine (and potentially chlorine) doped soot tube is then consolidated (step 407).

Figure 5:
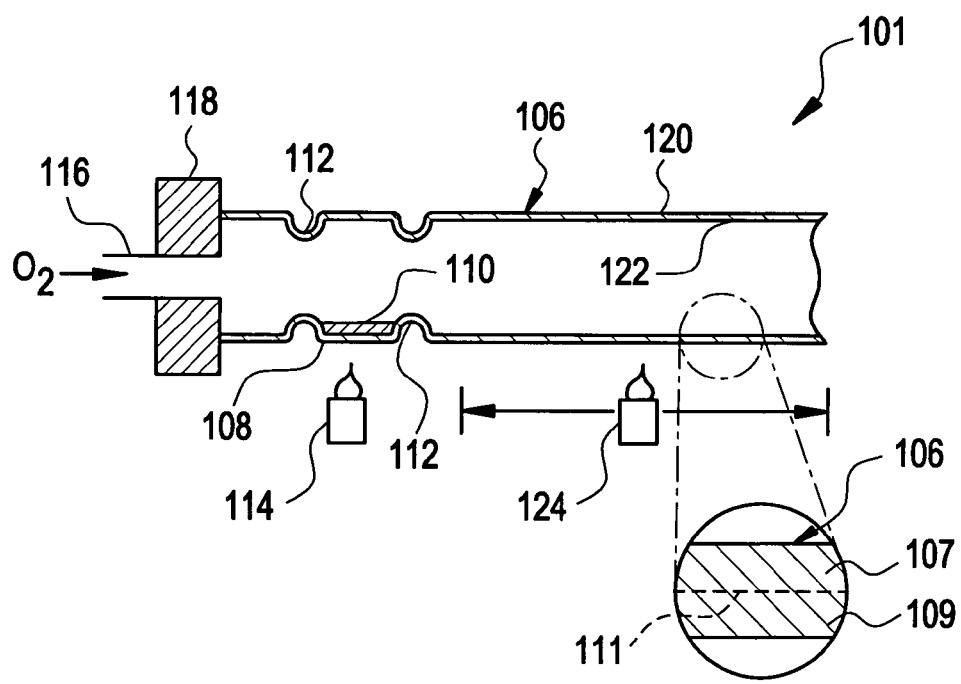
FIG. 5 depicts a method for doping a glass tube with an alkali metal oxide.

The consolidated glass tube is then alkali doped (step 404). For example, referring to FIG. 5, the resultant glass tube 106 is preferably first mounted between chucks in a lathe 101 (such as a glass-working lathe or a conventional modified chemical vapor deposition (MCVD) glass-forming lathe). A preferably annular reservoir 108 for receiving an alkali metal source compound 110 is formed near one end of tube 106 by forging two annular neck-like deformations 112 in the wall of tube 106 by flame working or otherwise welding the reservoir to the tube. Other types of reservoir may be also used. Preferably, the annular neck-like deformations 112 are about 2 cm from each other. Preferably, to prevent crystallization of the alkali metal, it is desirable that tube 106, and any additional glass deposited on the inside of tube 106, be essentially chlorine free. By essentially chlorine free we mean exhibiting a chlorine content sufficiently low that optical losses due to alkali chloride crystallization are avoided. A chlorine content preferably less than about 500 ppm by weight is desired for this purpose; more preferably less than about 100 ppm by wt.; and most preferably less than about 50 ppm by wt. In addition, silica glass tube 106, and any additional glass deposited therein, should be essentially free of "water". By "water" we mean the hydroxyl group OH. Water is responsible for an absorption peak at or about 1383 nm and which absorption peak may extend into the operating wavelength regions of an optical fiber. This peak may have a detrimental effect on the fiber attenuation. Therefore, it is desirable to reduce the absorption peak, also referred to as the water peak, by reducing the OH content of the glass as much as possible. Preferably, glass tube 106 contains less than about 100 ppb by wt. OH; and more preferably less than about 20 ppb by wt. To ensure that starting glass articles are essentially free of water prior to diffusing an alkali metal oxide dopant, conventional chlorine drying techniques may be employed during manufacture of the silica glass tube.

Referring again to FIG. 5, alkali source compound 110 is introduced into tube 106 at reservoir 108 and heated by heat source 114 to form a vapor as tube 106 is rotated. Oxygen or a carrier gas is flowed into the inlet 116 of tube 106 through rotating seal 118, and portion 120 of tube 106 downstream of the alkali metal oxide source compound 110 is heated to facilitate diffusion of the alkali metal oxide into interior surface 122 of tube 106. Preferably, the tube 106 does not have any preform components inserted therein, such as another glass rod or the like. The portion 120 of tube 106 downstream of the alkali metal oxide source compound 110 should be heated to a temperature sufficient to promote rapid diffusion of the alkali into surface 122 and to prevent devitrification of the glass. Preferably, portion 120 of tube 106 downstream of alkali metal oxide source compound 110 is heated by heat source 124 to above 1500° C.; more preferably between about 1500° C. and 2000° C. Preferably, heat source 124 is traversed along the length of portion 120 of tube 106. Alkali metal oxide source compound 112 preferably comprises an element selected from the group consisting of K, Na, Li, Cs, and Rb. Preferably, alkali metal oxide source compound 110 is a bromide, iodide or fluoride. Most preferably, the alkali metal oxide source compound 110 is KBr, KI or $KNO_3$. The alkali metal oxide (e.g., $K_2O$, $Na_2O$, $LiO_2$, $Rb_2O$, $Cs_2O$ and mixtures thereof) is preferably diffused throughout a depth of between about 100 microns and 500 microns from the inside diffusion surface 122 of tube 106 prior to collapse of tube 106 thereby forming an alkali oxide doped glass tube. In particular, it is preferred that the diffused alkali metal oxide dopant concentration (in wt. %) in the tube varies radially. Preferably, the glass article (e.g. tube 106) is doped such that the concentration is highest on an inner half portion 107 and lower in an outer half portion 109, as shown in the enlarged view of FIG. 5. The demarcation point between the inner and outer half portions is defined by and located at half the radial thickness (illustrated by dotted line 111) of the tube 106. For example, the diffusion is preferably such that the peak concentration of alkali dopant in the outer half portion 109 is less than 50% of the peak concentration (in wt. %) of the inner half portion 107.

The diffusion process may be followed by the step of further heating tube 106 to promote a partial collapse of tube 106 by conventional methods as are known in the art (or by the dry methods described herein) to both reduce the inside surface area through which the alkali metal oxide might be lost and to thicken the layer of glass into which the alkali metal oxide has been diffused. Once the diffusion doping step, or any partial collapse of tube 106 has been completed, the diffusion surface of the tube 122 may optionally be etched with an etchant, suitable for removing silica glass, to a depth sufficient to remove unwanted impurities that may have diffused through the diffusion surface 122 of the tube. An aqueous HF solution may be used as an etchant, for example. More preferably, a fluoride gas such as, for example, $CF_4$, $SF_6$, $NF_3$, $C_2F_6$ or a mixture thereof, is employed. The amount of material removed from inner surface 122 is dependent upon processing conditions during diffusion and any partial tube collapse, but the etching conditions are preferably sufficient to result in the removal of glass from surface 122 to a depth of at least about 5 percent of the total diffusion depth of the alkali metal oxide. Once etching is finalized, silica glass tube 106 is further heated with a heat source 124_to collapse tube 106 downstream of alkali metal oxide source compound 110 and form an alkali metal oxide-doped solid glass rod 132. Collapse of tube 106 is accomplished according to conventional methods known in the art, such as heating with a suitable heat source (e.g., a torch). The solid alkali-doped glass rod 132 is then cut from that portion of glass containing alkali metal source compound reservoir 108. Preferably, the solid alkali metal oxide-doped glass rod 132 is etched with a suitable etchant to remove some or all hydrated glass which may have been formed by the torch during collapse of the tube 106. If a dry heat source is used for collapse, for example, an induction or resistance heater, a plasma torch, or a dry heat source which uses a non-hydrogen containing fuel, such as CO, then etching may not be needed. Utilizing a dry heat source for the doping and/or collapsing steps is believed to minimize re-wetting of the outside of the tube, i.e., diffusing OH (water) into the tube from the outside and may, therefore, further reduce fiber attenuation. A dry heat source is one which does not induce any appreciable OH (water) into the tube.

It should be recognized that the alkali-doped rod 132 when collapsed preferably comprises (similar to the tube 106) concentrations of alkali metal oxide that vary radially and which are such that the portion corresponding to the inner half portion 107 has the highest peak concentration (in wt. %) of alkali dopant and the portion corresponding to the outer half portion 109 has a lower peak concentration. Most preferably, the peak concentration of alkali dopant is at the center of the rod and the concentration at half the radius is less than 50% of the peak concentration; and more preferably less than 25%.

Figure 6:
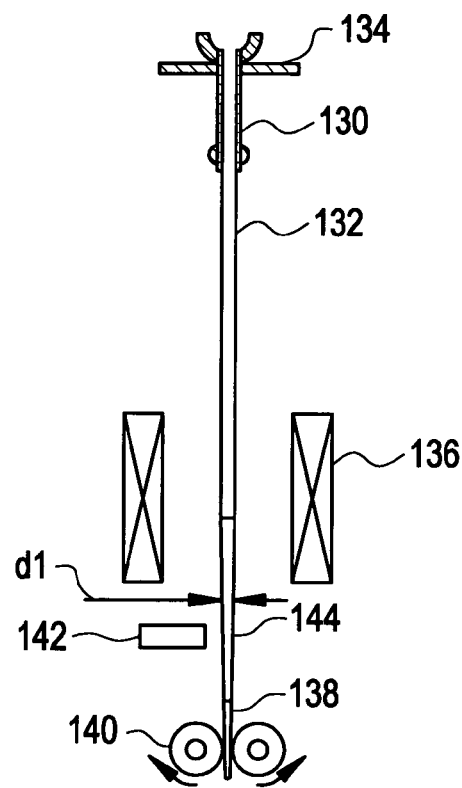
FIG. 6 illustrates a process for drawing a glass rod.

Doped glass rod 132 may be heated in a redraw furnace 136 and drawn into a smaller diameter glass rod 144. This redraw process is illustrated in FIG. 6. A glass handle 130 is attached to the alkali-doped glass rod 132 resulting from the collapse stage described supra and the alkali-doped glass rod 132 is mounted in a moving downfeed support 134 above a conventional redraw furnace 136. A sacrificial glass rod 138, which may be attached to the bottom of alkali-doped glass rod 132, is pulled by motor-driven tractors 140, thereby causing the alkali-doped glass rod 132 to be drawn at a suitable rate. A rate of 15 to 23 cm/min has been found to be adequate, the rate being largely controlled in response to the diameter measured by sensor 142. The outer diameter dimension (d1) of the small diameter glass rod 144 resulting from the drawing process is preferably in the range of 3 mm to 10 mm; more preferably less than 6 mm in diameter dimension. If the diameter dimension of rod 132 resulting from collapse step 426 is within the desired range, rod 132 resulting from collapse step 126 may be used as glass rod 144. The small diameter glass rod 144 should have a peak concentration of $K_2O$ between about 5 times and 10 times the peak $K_2O$ concentration desired in the core of the optical fiber when the optical fiber is drawn, to offset the significant migration of the alkali dopant during draw of the fiber. For example, if the peak $K_2O$ concentration in the optical fiber core is desired to be 0.4 wt. %, the small diameter glass rod 144 preferably should have a peak $K_2O$ concentration between about 2 wt. % and 4 wt. %. In particular, having a very small diameter of the alkali-doped rod is advantageous because this concentrates the transition metal impurities present in the rod very near the fiber's centerline where their negative impact is minimized. It should be recognized that for large amounts of material added to the doped clad, the peak concentration in the fiber could be 100 times less than the peak concentration in the small diameter glass rod. As indicated by step 429 of method 402, once formed, small diameter glass rod 144, according to this method, is further overclad.

For example, as illustrated in FIG. 4, the small diameter alkali-doped_glass rod 144 may be used as a starting rod upon which additional porous glass soot 162 is deposited as overclad using an OVD method, as is known in the art, to form an assembly 160. A typical outside vapor deposition method is illustrated in FIG. 4. As shown in FIG. 4, a glass handle 154 is attached to small diameter alkali-doped glass rod 144 manufactured as heretofore described and becomes an integral part of the resulting preform. Handle 154 provides a method of supporting the silica glass preform resulting from the deposition process during later processing steps. The glass rod 144 having the attached handle 154 is mounted in a lathe where it is rotated and translated with respect to burner 156 which may be, for example, of the type disclosed in U.S. Pat. No. 4,165,223. Fuel gas and oxygen, or air, are supplied to burner 156 from a source (not shown). This mixture is burned to produce a flame which is emitted from burner 156. A silica precursor gas-vapor mixture is oxidized within the flame to form a silica-containing soot stream 158 which is directed toward glass rod 144. Suitable means for delivering the gas-vapor mixture to burner 156 are well known in the art; for an illustration of such means reference is made to U.S. Pat. Nos. 3,826,560, 4,148,621 and 4,173,305. Composite soot preform 160 is formed by traversing glass rod 144 many times with respect to burner 156 to cause a build-up of many layers of silica soot-containing to form soot coating 162. The translating motion could also be achieved by moving burner 156 back and forth along rotating glass rod 144 or by the combined translational motion of both burner 156 and glass rod 144. Soot coating 162 forms at least a portion of the core glass of the composite preform 160 which is preferably comprised of substantially pure silica. Preferably, the soot coating has a density greater than 0.35 g/cc, more preferably between about 0.35 g/cc and 0.5 g/cc. The composite preform 160 is then dried by exposing it to a chlorine-containing gas while being heated in a furnace to a temperature of about 1000 C. The preform 160 is then fluorine doped. During the fluorine doping step, the preform 160 is preferably fluorine doped by exposing the preform to a fluorine-containing gas at temperatures (e.g. about 1000 C) suitable for causing the soot to become doped with the fluorine. In this way, the outer core region of the optical fiber is formed. However the fluorine doping step is only carried out long enough to allow a relatively small amount of fluorine (0.1 to 0.4 wt %), for example. The preform is then consolidated by heating the preform 160 to a suitable temperature for consolidating the preform. The resultant clear glass core preform may then be redrawn to form a second core rod, i.e. a glass rod which contains at least a portion of the core of an optical fiber drawn therefrom. The second core rod may then be further processed by adding additional glass, either by sleeving with a glass tube (either a glass tube or soot tube), through depositing glass soot by chemical vapor deposition, for example, by both sleeving and chemical deposition, or through other methods as are known in the art, to form a complete optical fiber preform ready to be drawn into an optical fiber. The additional glass may comprise core glass, cladding glass or both core and cladding glass. Further, the additional glass may take several additional deposition steps to achieve the desired thickness, wherein after each step, the soot is dried, fluorine doped, consolidated and redrawn into a smaller diameter rod. The outermost cladding, which is preferably the cladding adjacent the core, is silica preferably sufficiently down doped with fluorine by flood doping (see U.S. Pat. No. 4,629,485) to form the cladding region of the optical fiber. The doping is preferably sufficient to achieve a relative refractive index delta % between the core and the cladding of, for example, greater than 0.2%, and more preferably between 0.30% and 0.40%. In particular, for each additional step wherein moat silica (that additional glass corresponding with the cladding of the fiber) is added by deposition to the second rod, such moat silica is doped with fluorine. The moat soot is first dried by subjecting it to a chlorine-containing gas, and then exposed it to a fluorine-containing gas (e.g., $SiF_4$ or $CF_4$) for 60-120 minutes at 1225° C. and then consolidated by downdriving through the hot zone (of 1450-1500° C.) at 7-10 mm/min preferably in the presence of the fluorine-containing gas. This preform may be redrawn to form a third rod and the steps repeated again, i.e., deposition, drying, fluorine doping, and consolidation until the proper diameter final preform is achieved. Preferably, the fluorine wt. % in each successive layer of additional glass in the cladding is approximately the same or, more preferably, slightly less (approx. 0.1 to 0.5 wt % less) in the outermost cladding to minimize stress effects. After the complete optical fiber preform of step 467 is manufactured, the completed optical fiber draw preform is drawn into an alkali metal oxide doped optical fiber. After each redraw step described herein, the rod is preferably $D_2$ treated by exposing the rod to a deuterium atmosphere. Deuterium treatment is described in GB 2,149,392 and U.S. Pat. No. 4,515,612 and U.S. Pat. No. 4,504,297.

Other methods for making for making fibers are disclosed in U.S. Patent Publication Number 2005/0063663, the specification of which is hereby relied upon and incorporated by reference in its entirety.

In all of the embodiments disclosed herein, the optical fiber preferably comprises a primary coating surrounding and in direct contact with the outermost diameter of the cladding, and a secondary coating surrounding and in direct contact with the primary coating.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:
1. An optical fiber comprising:
   a silica-based core, said core comprising an alkali metal oxide selected from the group consisting of $K_2O$, $Na_2O$, $LiO_2$, $Rb_2O$, $Cs_2O$ and mixtures thereof in an average concentration in said core between about 50 and 500 ppm by weight, said core further comprising chlorine and fluorine, wherein the average concentration of fluorine in said core is greater than the average concentration of alkali metal oxide in said core and the average concentration of chlorine in said core is greater than the average concentration of alkali metal oxide in said core; and wherein the core of said fiber comprises a first region located along the centerline of the core which contains chlorine in a minimum amount which is less than 100 ppm, and a second core region surrounding said first region, said second region containing a peak chlorine concentration greater than 500 ppm, and a silica-based cladding surrounding and directly adjacent the core.

2. The optical fiber of claim 1, wherein said core further consists of essentially no germanium.

3. The optical fiber of claim 2, wherein the average concentration of said chlorine in said core is greater than about 500 ppm by weight.

4. The optical fiber of claim 2, wherein the average concentration of said fluorine in said core is greater than about 500 ppm by weight.

5. The optical fiber of claim 1, wherein the attenuation of said optical fiber at 1550 nm is less than 0.17 dB/km.

6. An optical fiber comprising:
a silica-based core, said core comprising an alkali metal oxide selected from the group consisting of $K_2O$, $Na_2O$, $LiO_2$, $Rb_2O$, $Cs_2O$ and mixtures thereof in an average concentration in said core between about 50 and 500 ppm by weight, said core further comprising chlorine and fluorine, wherein the average concentration of fluorine in said core is greater than the average concentration of alkali metal oxide in said core and the average concentration of chlorine in said core is greater than the average concentration of alkali metal oxide in said core; and wherein said core is essentially free of germanium and a silica-based cladding surrounding and directly adjacent the core.

7. The optical fiber of claim 6, wherein the average concentration of said chlorine in said core is greater than about 500 ppm by weight and the average concentration of said fluorine in said core is greater than about 500 ppm by weight.

8. The optical fiber of claim 7, wherein peak concentration of the chlorine in said second core region is higher than the peak concentration of fluorine in said second region.

9. The optical fiber of claim 7, wherein said fiber comprises chlorine in said core peak concentration amount greater than 1000 ppm.

10. The optical fiber of claim 7, wherein said fiber comprises chlorine in said core in a peak concentration amount greater than about 1500 ppm.

11. The optical fiber of claim 7, wherein the outer radius of said first region is less than 2 microns.

12. The optical fiber of claim 6, wherein the core of said fiber comprises a first region located along the centerline of the core which contains chlorine in a minimum amount which is less than 100 ppm, and a second core region surrounding said first region, said second region containing a peak chlorine concentration greater than 500 ppm.

13. The optical fiber of claim 6, wherein said fiber comprises chlorine in said core in a peak concentration amount greater than about 1500 ppm.

14. The optical fiber of claim 13, wherein said core further comprises fluorine in a peak concentration amount less than about 5000 ppm.

15. The optical fiber of claim 6, wherein the attenuation of said optical fiber at 1550 nm is less than 0.18 dB/km.

16. The optical fiber of claim 6, wherein the cladding is doped with fluorine in an average concentration greater than 10000 ppm.

17. The optical fiber of claim 16, wherein the cladding is doped with chlorine in an amount greater than 500 ppm.

18. The optical fiber of claim 6, wherein the alkali metal oxide is $K_2O$.

* * * * *